US006281981B1

(12) United States Patent
Yasui et al.

(10) Patent No.: US 6,281,981 B1
(45) **Date of Patent: *Aug. 28, 2001**

(54) IMAGE PRINTING APPARATUS

(75) Inventors: Shoji Yasui; Kazutomo Tawa, both of Tokyo; Kimio Kano, Kyoto, all of (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,421

(22) Filed: Jun. 25, 1998

(30) Foreign Application Priority Data

Oct. 30, 1997 (JP) .......... 9-298319

(51) Int. Cl.[7] .......... G06F 15/00

(52) U.S. Cl. .......... 358/1.15; 358/304; 358/488

(58) Field of Search .......... 358/1.15, 1.14, 358/1.16, 1.17, 1.12, 1.13, 1.11, 1.9, 1.6, 1.4, 1.5, 1.2, 304, 498, 488, 1.1; 382/151

(56) References Cited

U.S. PATENT DOCUMENTS

| | | | | |
|---|---|---|---|---|
| 4,888,717 | * | 12/1989 | Ditto et al. | 364/559 |
| 5,378,071 | | 1/1995 | Uehara | 400/636.1 |
| 5,462,372 | * | 10/1995 | Hirono | 400/615.2 |
| 5,777,654 | * | 7/1998 | Park | 347/176 |
| 5,829,897 | * | 11/1998 | Murai | 400/615.2 |
| 6,008,879 | * | 12/1999 | Masutani | 355/40 |

FOREIGN PATENT DOCUMENTS

| | | | |
|---|---|---|---|
| 0475767A2 | 3/1992 | (EP) | B41J/3/38 |
| 475625A2 | 3/1992 | (EP) | B41F/13/60 |
| 767066A2 | 9/1997 | (EP) | B41J/3/407 |
| 5293794 | 11/1993 | (JP) | B26D/5/00 |
| 95158541 | 3/1995 | (JP) . | |
| 8279879 | 10/1996 | (JP) | H04N/1/00 |
| 97554119 | 10/1997 | (JP) . | |

* cited by examiner

*Primary Examiner*—Joseph Mancuso
*Assistant Examiner*—Douglas Tran

(57) ABSTRACT

In order to obtain a print area from a printing start position to a printing end position in the longitudinal direction of printing paper without leaving any margin in the lateral direction of the paper, the width of a heater line of a thermal head (1*a*), corresponding to the lateral direction of the printing paper, is set to be not less than the width of the printing paper. Considering a shift length to be made by a cutter (6) in cutting, a CPU (10A) determines a first cutting position that is on the side of the print area with respect to the printing start position of the print area, and a final cutting position that is on the side of the print area with respect to the printing end position of the print area. Then, the CPU (10A) gives a cutting command which indicates the first and final cutting positions to the cutter (6) which will cut the printing paper at those positions. This allows an image printing apparatus to obtain cut printing paper which is entirely an effective print area without any margin.

7 Claims, 13 Drawing Sheets

IMAGE PRINTING APPARATUS

BACKGROUND OF THE INVENTION

1. Field of the Invention

The present invention relates to an image printing apparatus for, after printing an image on printing paper on the basis of an image signal, cutting the paper to obtain cut printing paper.

2. Background of the Invention

FIG. 16 roughly shows a structure of a printing unit (hereinafter referred to as a printing mechanical unit) 12 of the image printing apparatus using a thermal transfer recording method with a roll type of printing paper.

In FIG. 16, a thermal head 1 for patterning an image signal to thermally transfer it to printing paper is in contact with an ink sheet 2 coated by a thermal-soluble or thermal-sublimation ink for thermal transfer recording. Under the ink sheet 2 provided is printing paper 3. The ink sheet 2 and the printing paper 3 are brought into intimate contact with the thermal head 1 by being pressed by a platen roller 4 opposed to the thermal head 1, so that an image pattern in the thermal head 1 is thermally transferred to the printing paper 3 via the ink sheet 2. After the thermal transfer, the ink sheet 2 and the printing paper 3 are sent out by the rotation of the platen roller 4.

The ink sheet 2 and the printing paper are long roll types of paper. The ink sheet 2 is supplied from an ink sheet supply roll 201, and rolled up by an ink sheet take-up roll 202. The printing paper 3 is supplied from a printing paper supply roll 301, sent in a discharge direction via the proton roller 4 by a pinch roller 5, and cut by a cutter 6 on the basis of a cutting command from a CPU 10.

Next, a structure of an image printing apparatus 90 will be described with reference to FIG. 17. The image printing apparatus 90 is an apparatus for making a print by receiving an image signal inputted from the outside. It has an input terminal T1 for inputting a digital image signal.

The input terminal T1 is directly connected to a memory controller 22 which is an input and output interface of an image or control signal.

The memory controller 22 is connected to a frame memory 21 for storing picture information of one frame, a CPU (central processing unit) 10, and a transfer circuit 23 for making a data conversion for printing. The transfer circuit 23 is connected to the thermal head 1 of the printing mechanical unit 12.

The CPU 10 reads or writes an image signal from and to the frame memory 21 via the memory controller 22, and also has a function for controlling the printing mechanical unit 12 via a mechanical controller 11 which will be described later.

Further, the CPU 10 is connected to the mechanical controller 11 for controlling the mechanism of the printing mechanical unit 12, and the mechanical controller 11 is connected to all the equipment described with reference to FIG. 16. The CPU 10 is also connected to a programmable ROM 13 for storing, for example, a predetermined cutting position of the printing paper.

In such a structure, the digital image signal inputted via the input terminal T1 is temporarily stored into the frame memory 21 via the memory controller 22 under the control of the CPU 10.

The image signal stored in the frame memory 21 is read by the transfer circuit 23 via the memory controller 22 under the control of the CPU 10. The transfer circuit 23 converts the image signal into data for printing, and send it to the thermal head 1 of the printing mechanical unit 12. The data conversion of the image signal into the data for printing by the transfer circuit 23 includes a color conversion from an RGB signal to a YMC (yellow, magenta, and cyanogen) signal, a conversion from a YMC signal to a pulse signal for operating the thermal head, or the like.

Then, the thermal head 1 heats a heater line (an array of heating elements disposed on the head) for a given time to sink a thermal-soluble or thermal-sublimation ink applied to the ink sheet 2 into the printing paper 3 by means of thermal solution or thermal sublimation, thereby printing an image on the printing paper 3 on the basis of the data for printing obtained from the transfer circuit 23.

The printed printing paper is sent out by the pinch roller 5 of the printing mechanical unit 12, and cut by the cutter 6 on the basis of the cutting command from the CPU 10. A cutting position of the printed printing paper has been preset and stored in the programmable ROM 13. Thus, the CPU 10 gives the cutting command which indicates the cutting position stored in the programmable ROM 13 to the cutter 6 of the printing mechanical unit 12 via the mechanical controller 11. In order to change the cutting position, the programmable ROM 13 needs to be rewritten.

According to the structure of the printing mechanical unit 12 as shown in FIG. 16, the printing paper 3 has a blank area of a length L1 from the heater line of the thermal head 1 to the pinch roller 5. FIG. 18 shows an example of cut printing paper 30 outputted from the image printing apparatus 90. As shown in the figure, an area of the length L1 from the top end of the cut printing paper 30 to a printing start position RS is blank. This blank area is a margin M1 which is so wide that one can hold it.

In the conventional image printing apparatus 90, the printing paper is cut only one time after printing to a predetermined size at a cutting position CP in the vicinity of a printing end position RE, so that the wide margin M1 remains on the cut printing paper 30. If the cutting position CP is shifted to the opposite direction to a discharge direction of the paper, a margin M2 corresponding to a shift length L2 of the cutting position CP remains.

Since a width W1 of a heater line 16, which is a print width of the thermal head 1, is smaller than a width W2 of the printing paper 3 as shown in FIG. 19, a margin M3 of a length 13 and M4 of a length L4 also remain at the left and right of the printing paper 30, respectively, after printing.

Likewise, even for a multiple printing where a plurality of printing images are longitudinally printed in one print area as is the case with cut printing paper 31 in FIG. 20, the margins M1 to M4 remain even after the area is divided into printing images 311.

As described above, the conventional image printing apparatus 90 leaves the margins M1 to M4 at the top and bottom or the left and right of the cut printing paper 30. Especially at the printing start position RS, the wide margin M1 remains.

SUMMARY OF THE INVENTION

A first aspect of the present invention is directed to an image printing apparatus comprising: data conversion means for receiving an image signal from the outside and converting the image signal into data for printing; printing means for printing at least one printing image longitudinally on printing paper of a predetermined width to obtain a print area, on the basis of the data for printing; control means for giving a cutting command which indicates a cutting position of the printing paper; and cutting means for laterally cutting the printing paper on the basis of the cutting command. In the apparatus, a print width by the printing means, corresponding to a lateral direction of the printing paper, is set to be not less than the predetermined width of the printing paper. Further the control means determines a first cutting position that is on the side of the print area with respect to a printing start position of the print area and a final cutting position that is on the side of the print area with respect to a printing end position of the print area, and gives the cutting command which indicates the first and final cutting positions to the cutting means.

Preferably, in the image printing apparatus according to a second aspect of the present invention, the control means determines the first cutting position that is on the side of the print area not less than the maximum shift length to be caused by the cutting means with respect to the printing start position, and the final cutting position that is on the side of the print area not less than the maximum shift length to be caused by the cutting means with respect to the printing end position.

Preferably, in the image printing apparatus according to a third aspect of the present invention, the print area includes a multiple print area where a plurality of printing images are longitudinally printed adjacent to each other; and the control means determines a border between adjacent printing images of the plurality of printing images as at least one intermediate cutting position, and gives the cutting command which indicates the at least one intermediate cutting position as well as the first and final cutting positions, to the cutting means.

Preferably, in the image printing apparatus according to a fourth aspect of the present invention, the data conversion means includes: image signal processing means for receiving the image signal, and obtaining a processed image signal by processing the image signal so that a picture pattern having a predetermined width is laterally printed at both longitudinal ends of each of the plurality of printing images on the printing paper; and processed image signal conversion means for converting the processed image signal into the data for printing.

Preferably, in the image printing apparatus according to a fifth aspect of the present invention, the image signal processing means sets the predetermined width of the picture pattern to be not less than the maximum shift length to be caused by the cutting means.

Preferably, in the image printing apparatus according to a sixth aspect of the present invention, the image signal processing means further receives a pattern signal for specifying a predetermined pattern, and obtains the processed image signal by processing the image signal so that the picture pattern including the predetermined pattern is printed.

In the image printing apparatus according to the first aspect, the print width by the printing means corresponding to the lateral direction of the printing paper, is set to be not less than a predetermined width of the printing paper. Further, the control means determines the first cutting position that is on the side of the print area with respect to the printing start position of the print area and the final cutting position that is on the side of the print area with respect to the printing end position of the print area, and gives the cutting command which indicates the first and final cutting positions to the cutting means. Thus, even if the first and final cutting positions are somewhat shifted in the longitudinal direction of the printing paper in cutting, the cut printing paper which is entirely an effective print area without any margin, is obtainable.

Further, in the image printing apparatus according to the second aspect, the control means determines the first cutting position that is on the side of the print area not less than the maximum shift length to be caused by the cutting means with respect to the printing start position, and the final cutting position that is on the side of the print area not less than the maximum shift length with respect to the cutting end position. Thus, even with the maximum shift length in the opposite direction to the print area, the printing paper will be always cut at the print area. Consequently, the cut printing paper which is entirely an effective print area without any margin, is obtainable.

Further, in the image printing apparatus according to the third aspect, the control means determines a border between adjacent printing images of the plurality of printing images as at least one intermediate cutting position, and gives the cutting command which indicates at least one intermediate cutting position as well as the first and final cutting positions, to the cutting means. Thus, plural pieces of cut printing paper which are entirely effective print areas without any margin, are obtainable.

In the image printing apparatus according to the fourth aspect, the image signal processing means obtains a processed image signal by processing an image signal so that a picture pattern having a predetermined width is laterally printed in both longitudinal ends of each of the plurality of printing images on the printing paper. Thus, even if at least one intermediate cutting position is somewhat shifted in the longitudinal direction of the printing paper in cutting, the printing paper will be always cut at the picture pattern having a predetermined width. Namely, one image would never extend over two pieces of cut printing paper. This provides plural pieces of cut printing paper having good appearances.

Further, in the image printing apparatus according to the fifth aspect, the image signal processing means sets the predetermined width of the picture pattern to be not less than the maximum shift length to be made by the cutting means. Thus, even with the maximum shift length, the printing paper will be always cut at the picture pattern having the predetermined width.

This certainly prevents one image from extending over two pieces of cut printing paper, thereby providing plural pieces of cut printing paper having good appearances.

In the image printing apparatus according to the sixth aspect, the image signal processing means further receives the pattern signal for specifying a predetermined pattern, and processes the image signal so that the picture pattern including the predetermined pattern is printed. Thus, an additional value can be added to the original image by providing a pattern signal for specifying a predetermined pattern matching the image to be printed, to the image signal processing means. This improves plural pieces of cut printing paper in appearance.

The present invention provides the image printing apparatus for producing cut printing paper which is entirely an effective print area without any margin.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment 1-1. Structure

Figure 1:
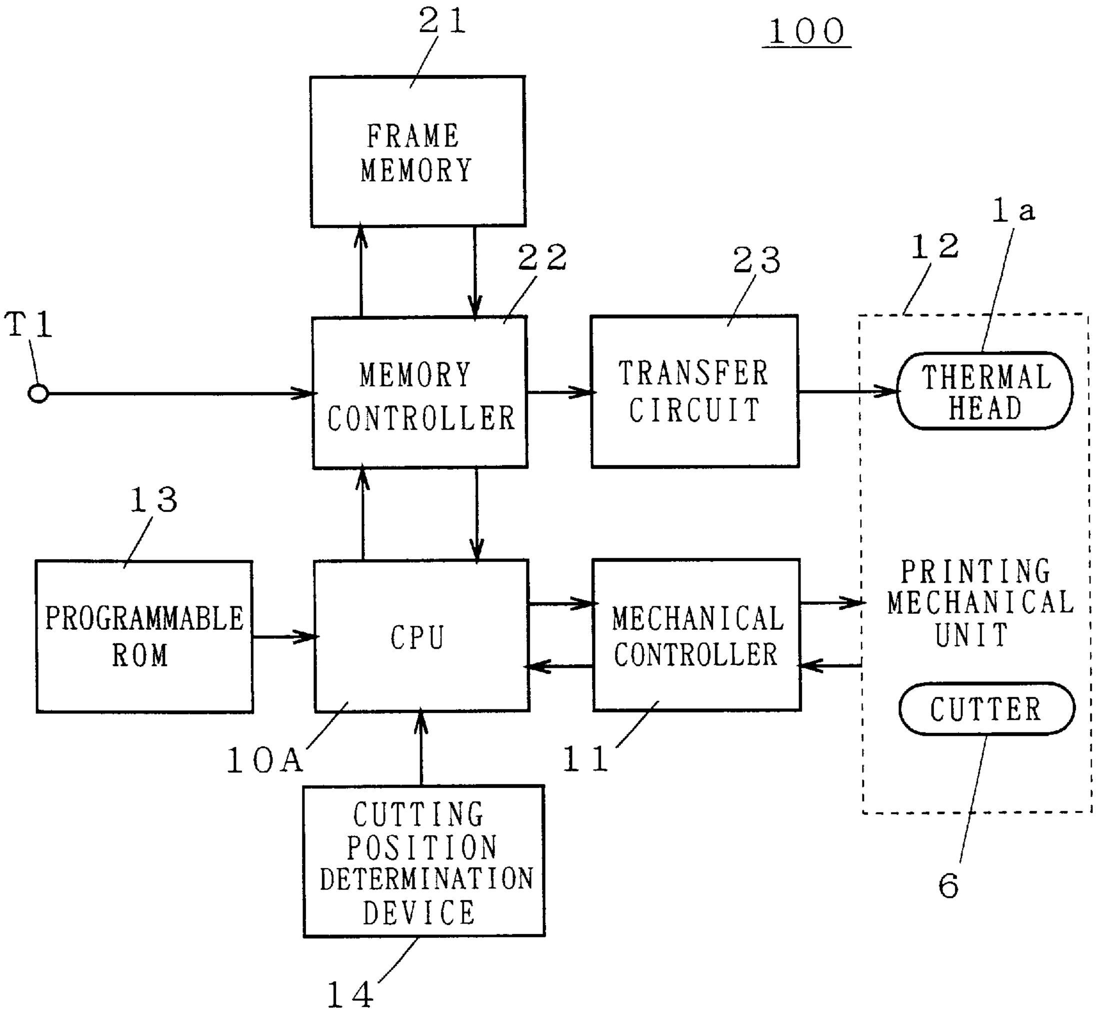
FIG. 1 is a block diagram of an image printing apparatus according to a first preferred embodiment of the present invention.

FIG. 1 is a block diagram of a structure of an image printing apparatus using a thermal transfer recording method according to a first preferred embodiment of the present invention. As shown in the figure, a CPU 10A is connected to a cutting position determination device 14 for voluntarily determining a cutting position of printing paper. Also, the CPU 10A has a cutting position automatic calculation function for automatically determining the cutting position on the basis of print information stored in a mechanical controller 11 which will be described later, so as not to leave any margin.

Figure 2:
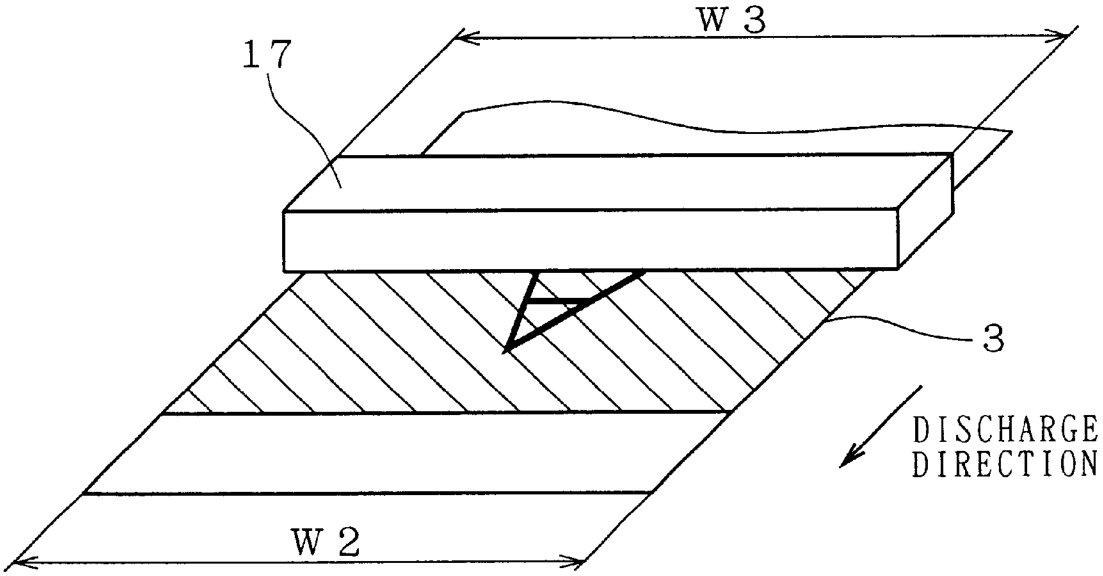
FIG. 2 is a perspective view of a heater line of a thermal head.

Further, since a width W3 of a heater line 17 of a thermal head 1*a* is larger than a width W2 of the printing paper 3 as shown in FIG. 2, both left and right edges of the heater line 17 jut out beyond the printing paper 3. This allows the printing paper 3 to be printed to the very edges without any left or right margin. For convenience of description, a discharge direction is assumed as a longitudinal direction of the printing paper 3, and a direction perpendicular to the discharge direction as a lateral direction of the printing paper 3.

Figure 16:
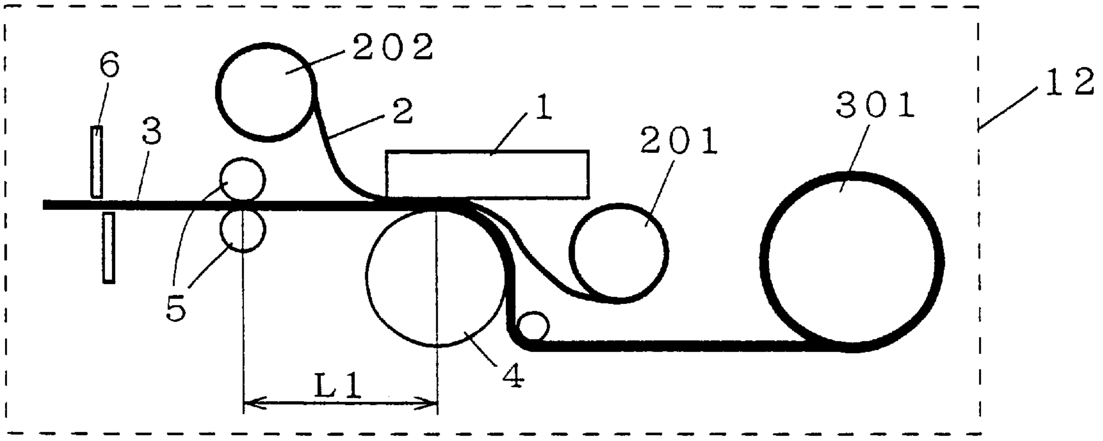
F I G. 1 6 BACKGROUND ART
FIG. 16 is an illustration of a mechanical unit of the image printing apparatus.
Figure 17:
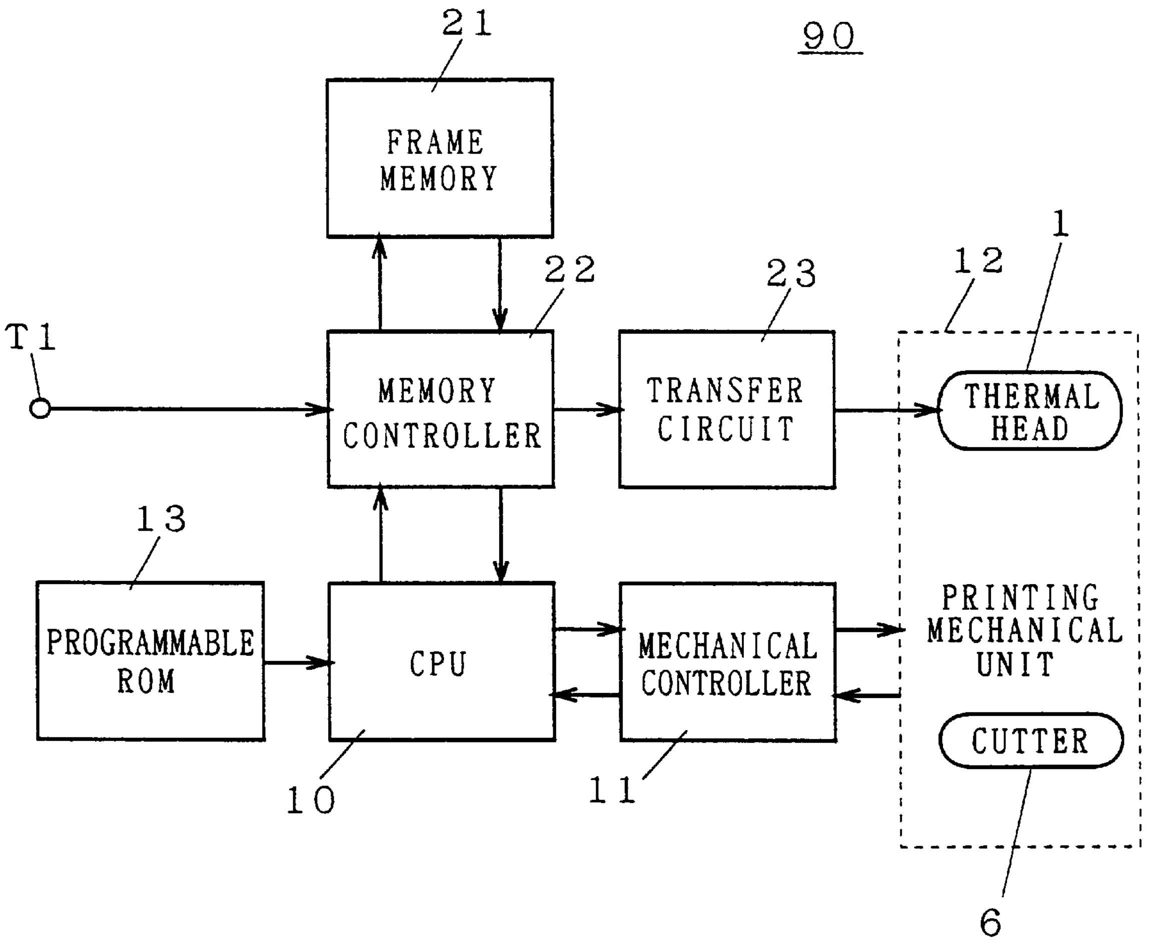
F I G. 1 7 BACKGROUND ART
FIG. 17 is a block diagram of a structure of a conventional image printing apparatus.
Figure 18:
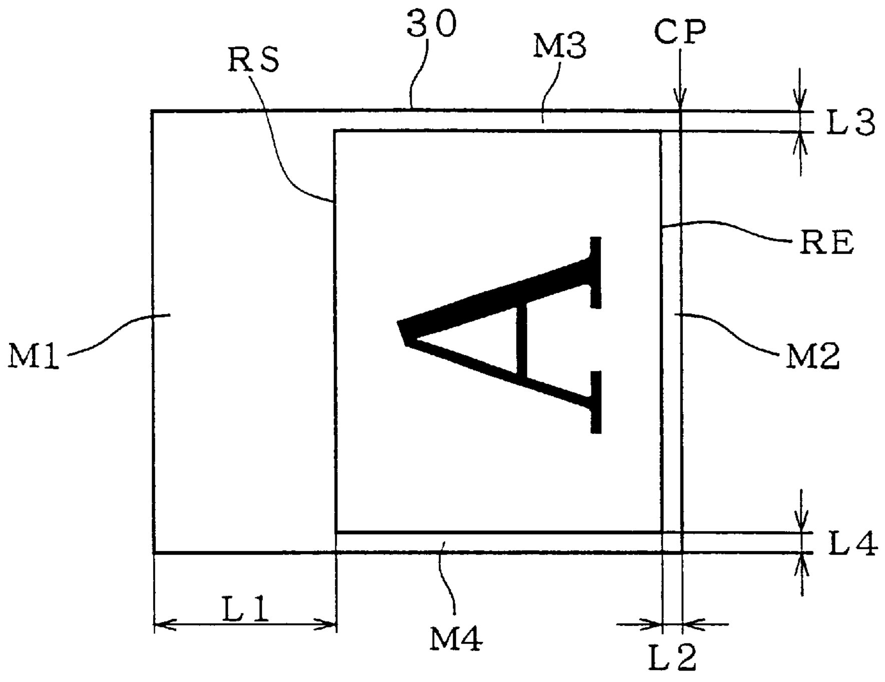
FIG. 18 BACKGROUND ART
FIG. 18 is an illustration of printed printing paper after cutting for the single printing, produced by the conventional image printing apparatus.
Figure 19:
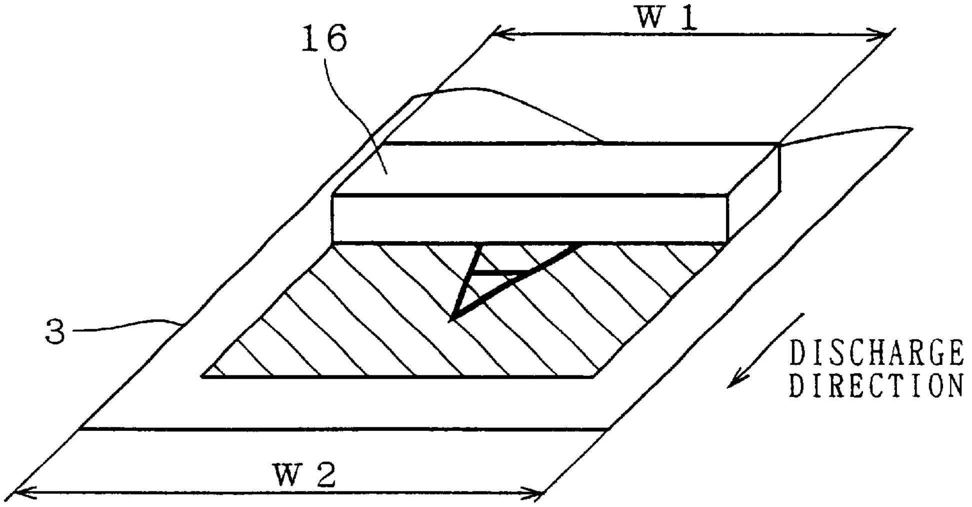
FIG. 19 BACKGROUND ART
FIG. 19 is a perspective view of a heater line of a conventional thermal head.
Figure 20:
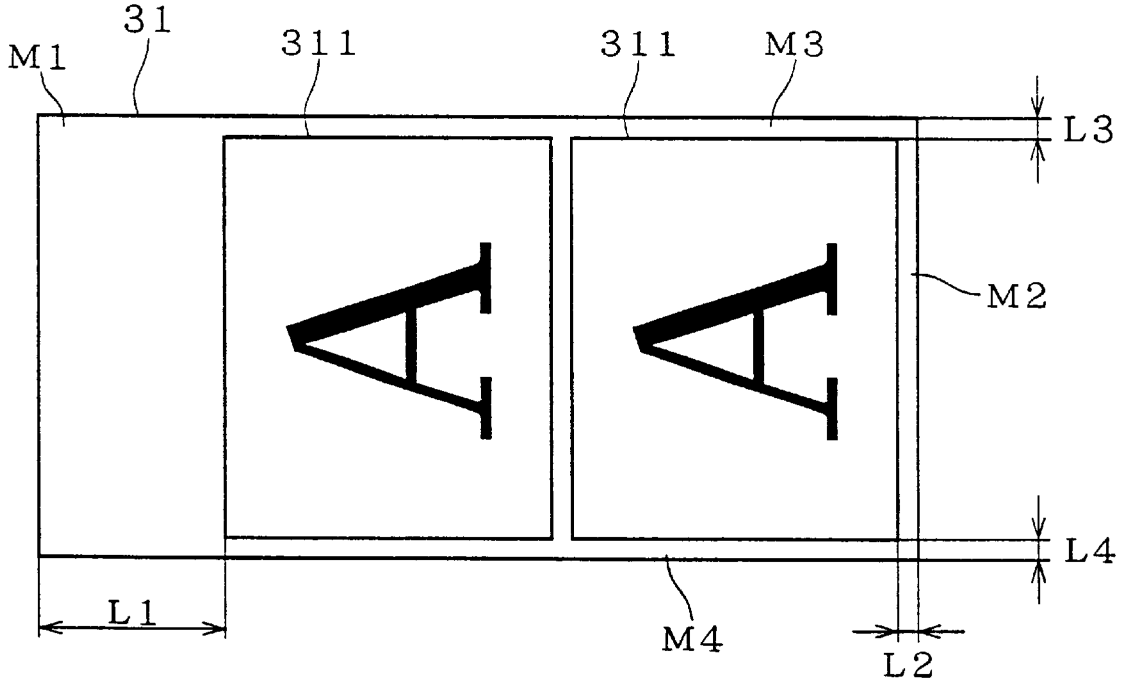
FIG. 20 BACKGROUND ART
FIG. 20 is an illustration of printed printing paper after cutting for the multiple printing, produced by the conventional image printing apparatus.

As similar to those of the conventional image printing apparatus 90 in FIG. 17, the other components are indicated by the same reference numerals, and omitted from the description. Further, the structure of a printing mechanical unit 12 is similar to that of the conventional unit in FIG. 16 except that the thermal head 1 is substituted by the thermal head 1*a*, so that the following description will be given with reference to FIG. 16.

1-2. Operation in General

In such a structure, a digital image signal inputted via an input terminal T1 is temporarily stored in a frame memory 21 via a memory controller 22 under the control of the CPU 10A.

The image signal stored in the frame memory 21 is read by a transfer circuit 23 via the memory controller 22 under the control of the CPU 10A. The transfer circuit 23 converts the image signal into data for printing to send it to the thermal head 1*a* of the printing mechanical unit 12. The data conversion of the image signal by the transfer circuit 23 includes a color conversion from an RGB signal into a YMC (yellow, magenta, and cyanogen) signal, a conversion from the YMC signal into a pulse signal for operating the thermal head, or the like.

The thermal head 1*a* then heats a heater line for a given time to sink a thermal-soluble or thermal-sublimation ink coated on an ink sheet into the printing paper 3 by means of thermal solution or thermal sublimation, thereby printing an image on the printing paper 3 on the basis of the data for printing obtained from the transfer circuit 23.

At this time, by expanding a print width of the thermal head 1*a* (i.e. the width W3 of the heater line 17) larger than the width W2 of the printing paper 3, the printing paper 3 can be printed to the very edges in its lateral direction without any margin. Namely, the whole printing paper 3 from the printing start position RS to the printing end position RE can be an effective print area. As in the conventional case, however, a margin M1 of a length L1 from the top end R0 of the printing paper to the printing start position RS still remains.

The printed printing paper 3 is sent out by a pinch roller 5 of the printing mechanical unit 12, and cut by a cutter 6. The cutter 6 is controlled by a cutting command from the CPU 10A via the mechanical controller 11.

1-3. Setting of Cutting Position (Single Printing)

Figure 3:
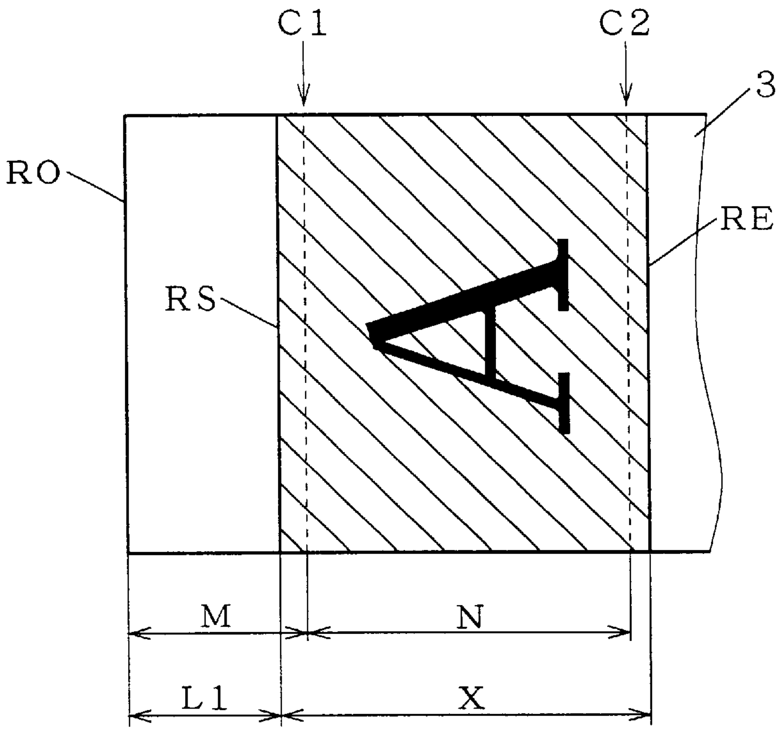
FIG. 3 is an illustration of printed printing paper before cutting for a single printing.

For a single printing where one printing image is printed on the printed printing paper 3 as shown in FIG. 3, the printed printing paper 3 needs to be cut at a first cutting position C1 in the vicinity of the printing start position RS and at a final cutting position C2 in the vicinity of the printing end position RE. At this time, the CPU 10A outputs the cutting command which indicates the first and final cutting positions C1 and C2 satisfying the following conditions (1) and (2):

(1) A distance M from the top end R0 of the printing paper to the first cutting position C1 satisfies $\{M \geqq L1+\Delta S1\}$, where A $\Delta S1$ is the maximum shift length of the cutting position C1 to be made by the cutter 6 in cutting.

(2) A distance N from the first cutting position C1 to the final cutting position C2 satisfies $\{M+N+\Delta S2 \leqq L1+X\}$, where $\Delta S2$ is the maximum shift length of the final cutting position C2 to be made by the cutter 6 in cutting ($=\Delta S1$), and X is the length from the printing start position RS to the printing end position RE.

With consideration of the shift to be made by the cutter 6 in cutting, the first cutting position C1 is determined so as to be on the side of the print area (from the printing start position RS to the printing end position RE) with respect to the printing start position RS of the print area, while the final cutting position C2 is determined so as to be on the side of the print area with respect to the printing end position RE of the print area.

In this manner, the printing paper 3 is laterally cut by the cutter 6 under the cutting command which indicates the first and final cutting positions C1 and C2 satisfying the conditions (1) and (2).

Figure 4:
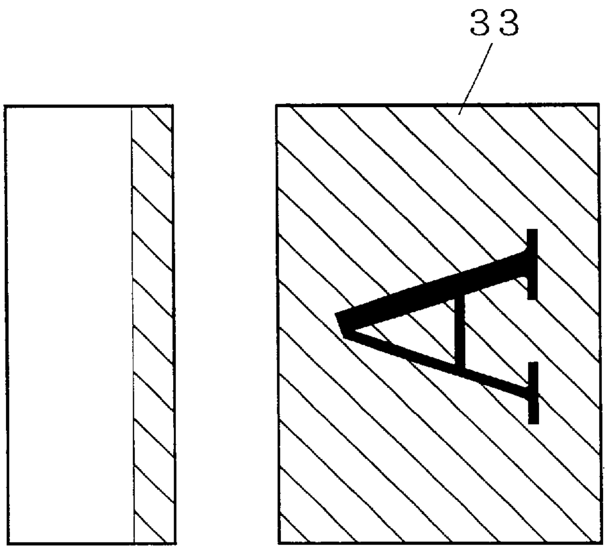
FIG. 4 is an illustration of the printed printing paper after cutting for the single printing.

Therefore, even if the first and final cutting positions C1 and C2 are shifted to the maximum shift length ΔS1 and ΔS2 in the opposite direction to the print area, respectively, the printing paper can be always cut at the print area. This provides cut printing paper 33 without any margin at the top and bottom or left and right as shown in FIG. 4.

Figure 5:
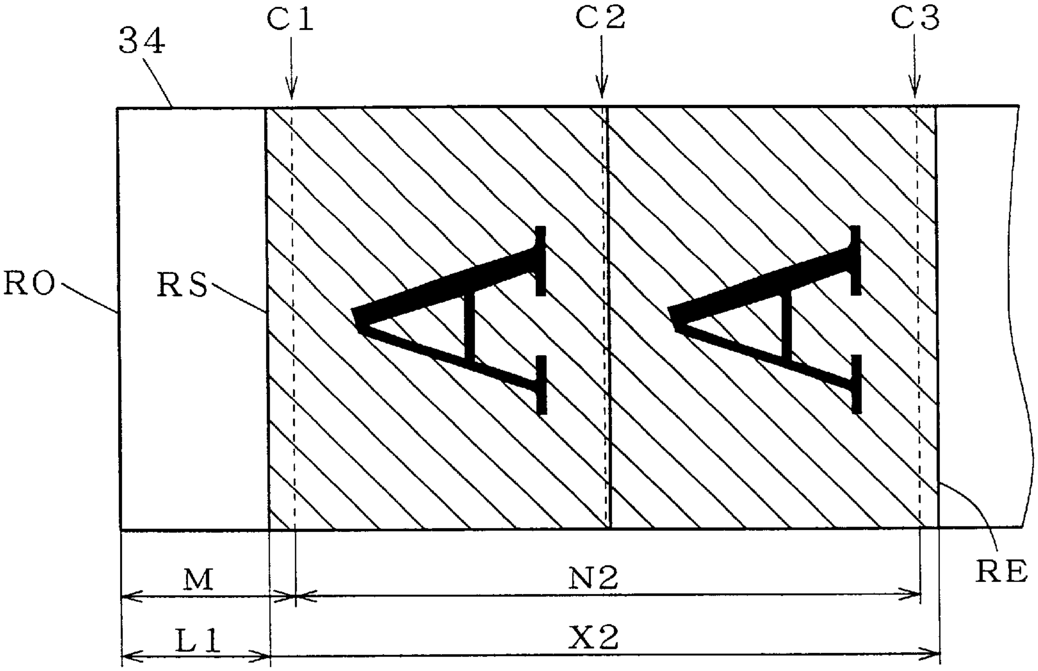
FIG. 5 is an illustration of printed printing paper before cutting for a multiple printing.

1-4. Setting of Cutting Position (Multiple Printing) For a multiple printing where a plurality of printing images (two in FIG. 5) are longitudinally printed adjacent to each other in one print area as shown in FIG. 5, printed printing paper 34 needs to be cut at an intermediate cutting position C2 between two printing images as well as at first and final cutting positions C1 and C3 in the vicinity of the printing start position RS and printing end position RE, respectively. In this case, the CPU 10A outputs a cutting command which indicates the first and final cutting positions C1 and C3 satisfying the following conditions (11) and (12), and the intermediate cutting position C2 satisfying the following condition (13):

(11) A distance M from the top end R0 of the printing paper to the first cutting position C1 satisfies {M≧L1+ΔS1}, where ΔS1 is the maximum shift length of the first cutting position C1 to be made by the cutter 6 in cutting;

(12) A distance N2 from the first cutting position C1 to the final cutting position C3 satisfies {M+N2+ΔS3≦L1+X2}, where ΔS3 is the maximum shift length of the final cutting position C3 to be made by the cutter 6 in cutting (=ΔS1), and X2 is the length from the printing start position RS to the printing end position RE;

(13) The intermediate cutting position C2 is determined so as to be in the vicinity of a border between adjacent two printing images.

With consideration of the shift to be made by the cutter 6 in cutting, the first cutting position C1 is determined so as to be on the side of the print area with respect to the printing start position RS of the print area, and the final cutting position C3 so as to be on the side of the print area with respect to the printing end position RE of the print area.

In this manner, the printing paper 3 is laterally cut by the cutter 6 on the basis of the cutting command which indicates the first and final cutting positions C1 and C3 satisfying the conditions (11) and (12), and the intermediate cutting position C2 satisfying the condition (13).

Figure 6:
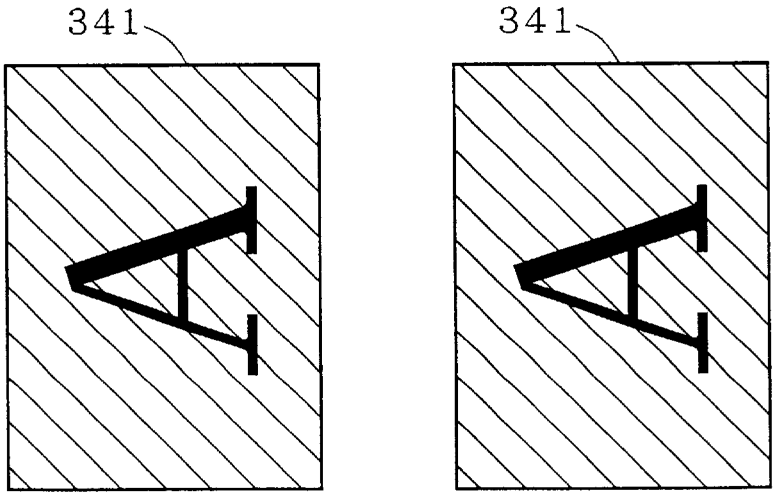
FIG. 6 is an illustration of the printed printing paper after cutting for the multiple printing.

Therefore, even if the first cutting position C1 and the final cutting position C3 are shifted to the maximum shift length ΔS1 and ΔS2 in the opposite direction to the print area, the printing paper can be always cut at the print area. This provides plural pieces of cut printing paper 341 without any margin at the top and bottom or left and right as shown in FIG. 6.

Even for the multiple printing where P (≧3) printing images are continuously printed, P pieces of cut printing paper without any margin at the top and bottom or left and right can be obtained by applying the aforementioned conditions (11) to (13) to the final cutting position C(P+1) and the intermediate cutting position CP (from C2 to CP). Further, the multiple printing includes either cases where all printing images are the same or where they are different from each other.

1-5. Setting of Cutting Position (Other Cases)

When the number of printing images and the sizes of the print area or printing paper are all fixed, the length from the printing start position RS to the printing end position RE (corresponding to X in FIG. 3 and X2 in FIG. 5) is fixed. In this case, the length L1 of the margin M1 can be uniquely determined according to the structure of the printing mechanical unit 12, and the maximum shift lengths ΔS1 and ΔS2 (or ΔS3) of the first and final cutting positions, respectively, can be previously obtained. Thus, the lengths (N, N2, M or the like) satisfying the conditions (1) and (2) or (11) and (12) and specifying the first and final cutting positions, can be preset.

When the contents of the print has been already known as described above, the first and final cutting positions may be able to set in a programmable ROM 13. It may be also possible to determine a desired cutting position by the cutting position determination device 14 while ignoring the information stored in the programmable ROM 13. For instance, when there is a change in the structure of the printing mechanical unit 12 or in the contents of the print including the size of the print area, the number of printing images, or the like, the determination of the cutting position by the cutting position determination device 14 becomes effective.

Especially, when the cutting operation is simply repeated at fixed positions as in the step for obtaining the cut printing paper 33 in FIG. 4 or 341 in FIG. 6, the printing paper can be simply and easily cut under the control of the CPU 10A by determining the cutting position by the cutting position determination device 14. This achieves an easy-to-use image printing apparatus for users.

Further, it may be also possible to set some cutting positions in the programmable ROM 13 and determine the remaining cutting positions by the cutting position determination device 14. For example, as in the conventional case, with only the final cutting position set in the programmable ROM 13, the other cutting positions may be determined on the basis of the final cutting position.

The cutting position to be determined by the cutting position determination device 14 is not limited to the first or final cutting position. The device 14 may determine other cutting positions necessary for the multiple printing.

Further, it may be also possible to determine only a reference cutting position (generally the final cutting position) and the number of cuttings by the cutting position determination device 14, and obtain the other cutting positions by the CPU 10A. The CPU 10A has the cutting position automatic calculation function for automatically determining the other cutting positions on the basis of the print information from the mechanical controller 11 as well as the reference cutting position and the number of cuttings from the cutting position determination device 14. Thus, for the multiple printing, for example, the other cutting positions can be automatically and appropriately calculated with this function.

Further, if the print information of the mechanical controller 11 includes not only the type of printing, multiple or single, but also the type of the printing paper or the number of printing images in the multiple printing, the CPU 10A can automatically calculate all the cutting positions satisfying the aforementioned conditions (1) and (2) or (11) to (13) only with the print information. This print information is provided to the mechanical controller 11 before printing, for example, by the input from information input means (not shown).

1-6. Cutting Operation

Figure 7:
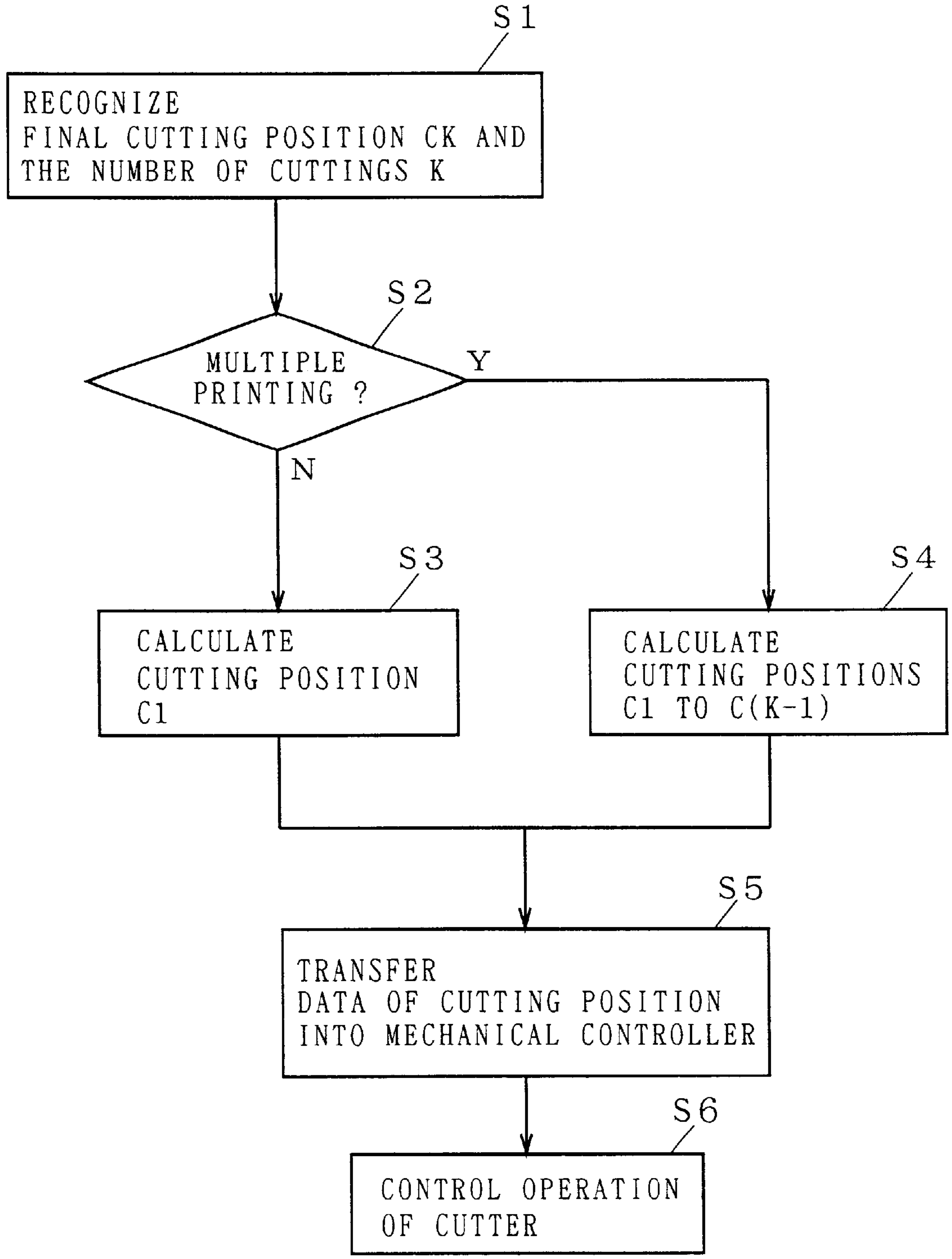
FIG. 7 is a flow chart of a cutting operation of the image printing apparatus according to the first preferred embodiment.

FIG. 7 is a flow chart of the cutting operation of the image printing apparatus according to the first preferred embodiment. Although there are many methods for determining the cutting positions with the aforementioned conditions (1) and (2) or (11) to (13), we will now describe, as an example, one cutting operation performed under the control of the CPU 10A which receives the final cutting position and the number of cuttings from the cutting position determination device 14.

First, a final cutting position CK and the number of cuttings K obtained from the cutting position determination device 14 are recognized at a step S1.

Then, whether the printing is multiple or single is determined on the basis of whether the number of cuttings K is not less than 3 or not at a step S2. For the single printing, the process goes to a step S3, while for the multiple printing, to a step S4.

At the step S3, with reference to the final cutting position C2, the first cutting position C1 satisfying the aforementioned conditions (1) and (2) is obtained.

At the step S4, with reference to the final cutting position CK, the first cutting position C1 satisfying the aforementioned conditions (11) and (12), and the intermediate cutting positions C2 to C(K−1) satisfying the aforementioned condition (13), are obtained.

Through either of the step S3 or S4, the cutting positions C1 through CK corresponding to the number of printing images are determined. Then, the information of all the cutting positions C1 through CK is transferred to the mechanical controller 11 at a step S5, and, by controlling the operation of the cutter 6 at a step S6, the printing paper is laterally cut per printing image unit. In this way, (K−1) pieces of cut printing paper without any margin at the top and bottom or left and right are obtained.

2. Second Preferred Embodiment 2-1. Modification of Multiple Printing

When picture patterns on both top and bottom ends of the printing image are plain as shown in FIG. 5, even if the intermediate cutting position C2 is somewhat shifted in the longitudinal direction, the cut printing paper 341 would not be deteriorated in appearance as shown in FIG. 6.

However, when a pattern in the vicinity of a border between two printing images is not plain, the shift of the intermediate cutting position C2 causes one of the images to extend over two pieces of cut printing paper, thereby deteriorating a part of the cut printing paper in appearance.

Figure 8:
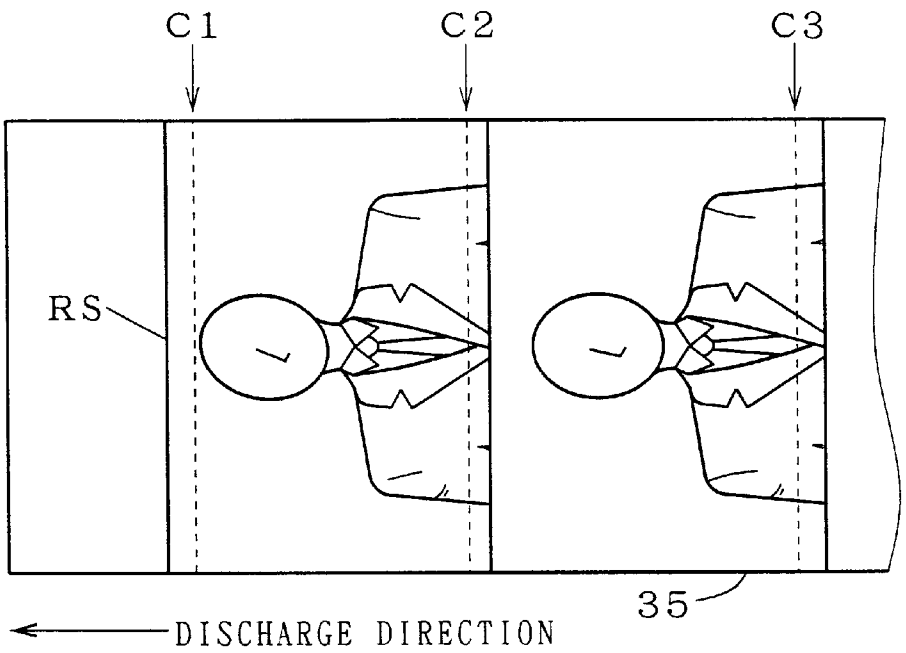
FIG. 8 is an illustration of printed printing paper before cutting for the multiple printing.
Figure 9:
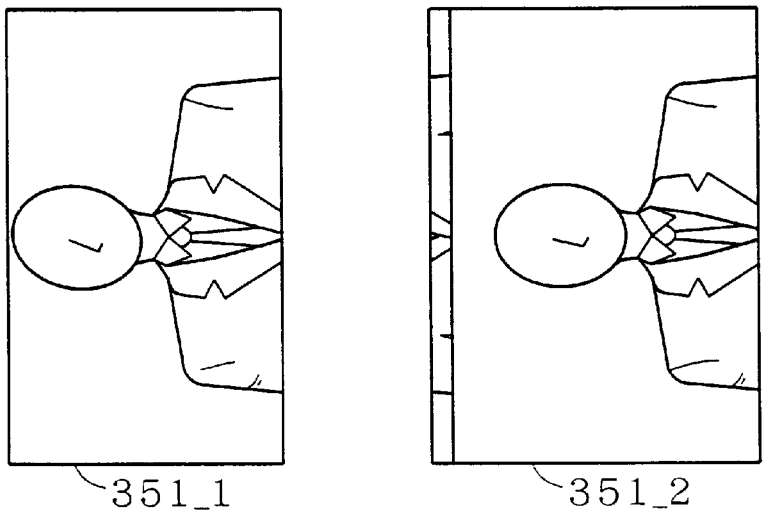
FIG. 9 is an illustration of the printed printing paper after cutting for the multiple printing.

For example, when the upper part of a person's body is printed at a border between two printing images, and the intermediate cutting position C2 therebetween is shifted in the discharge direction as shown in FIG. 8, a part of the image to be generally on cut printing paper 351_1 is left on cut printing paper 351_2 as shown in FIG. 9. This deteriorates the cut printing paper 351_2 in appearance.

Figure 10:
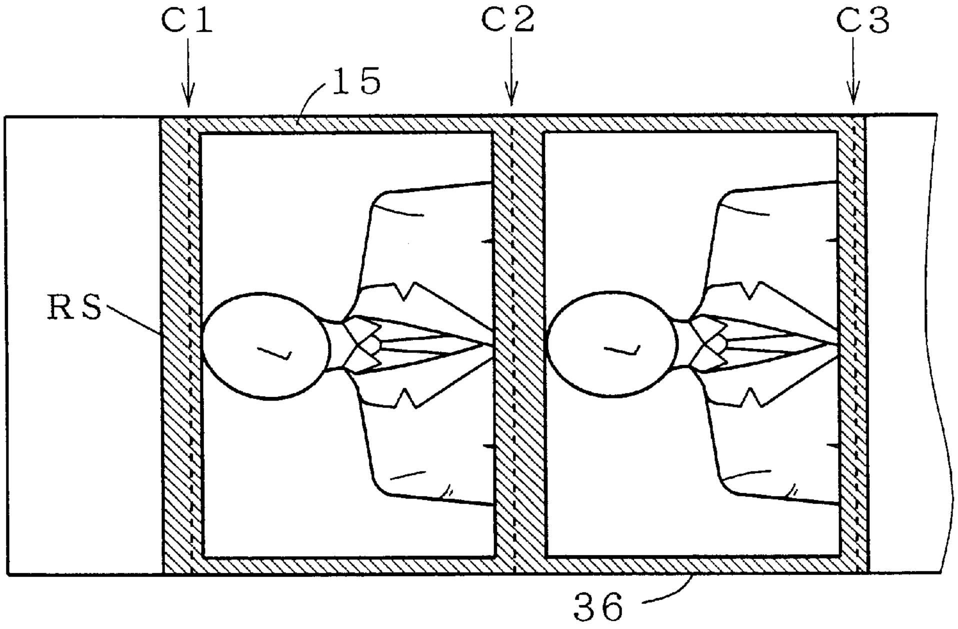
FIG. 10 is an illustration of printed printing paper before cutting for the multiple printing according to a second preferred embodiment of the present invention.
Figure 11:
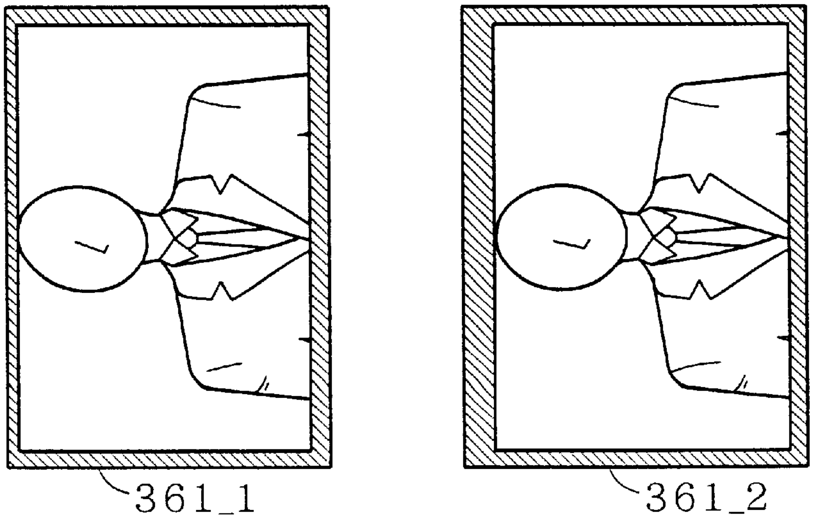
FIG. 11 is an illustration of the printed printing paper after cutting for the multiple printing according to the second preferred embodiment.

To avoid this problem, considering the shift length of the intermediate cutting position C2, a frame picture pattern 15 is printed with the original image as shown in FIG. 10. Thus, even with the shift length of the intermediate cutting position C2, the two pieces of cut printing paper 361_1 and 361_2 would not be deteriorated in appearance as shown in FIG. 11 This is the characteristics of the image printing apparatus according to the second preferred embodiment.

2-2. Structure

Figure 12:
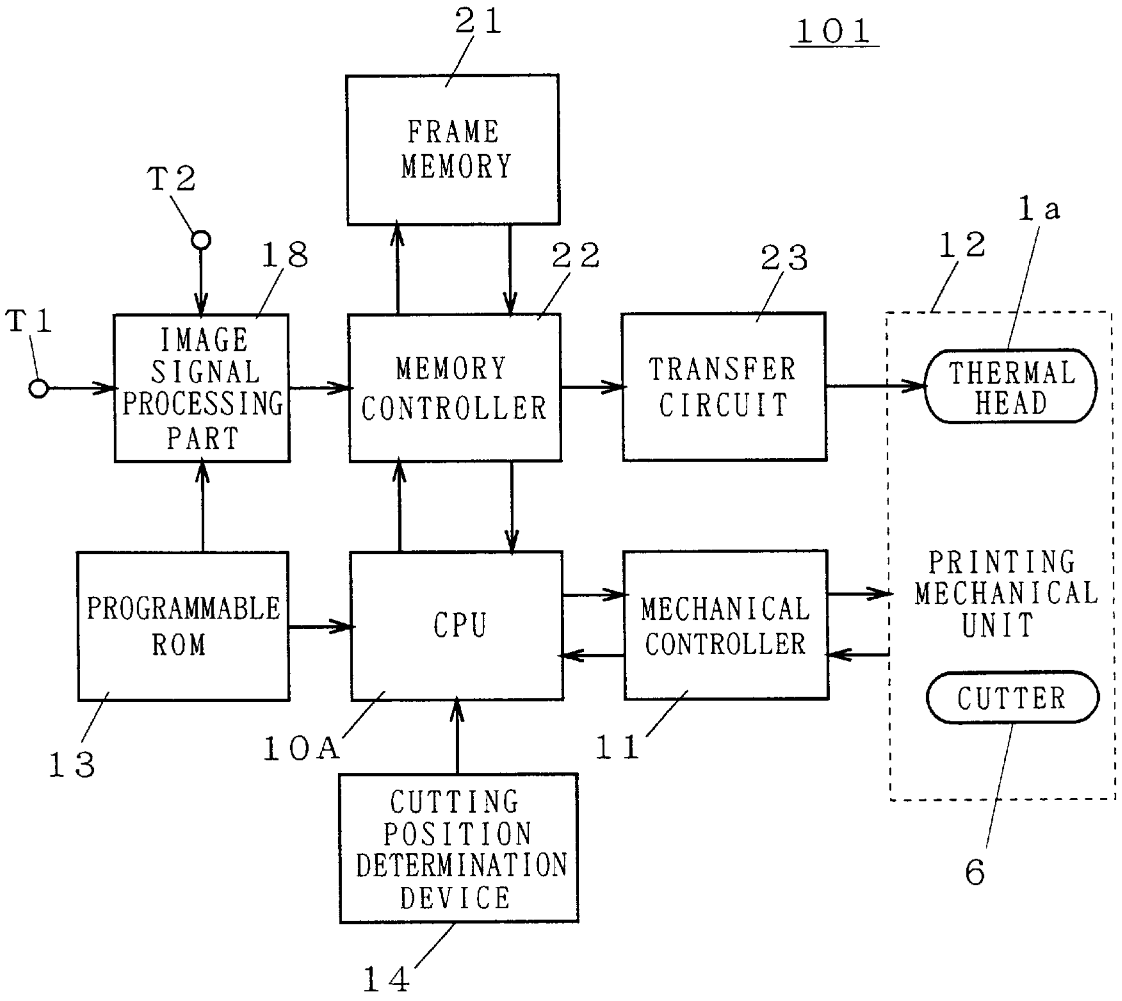
FIG. 12 is a block diagram of an image printing apparatus according to a third preferred embodiment of the present invention.

FIG. 12 is a block diagram of a structure of an image printing apparatus according to a second preferred embodiment of the present invention, featuring a newly provided image signal processing part 18.

Figure 13:
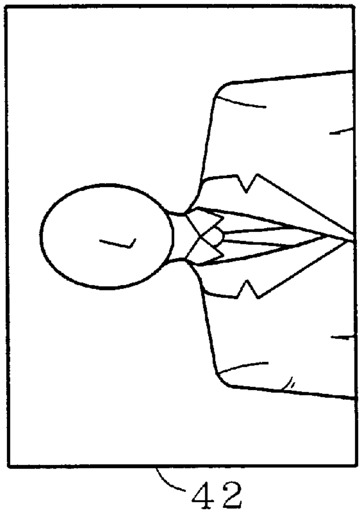
FIG. 13 is an illustration of an original image.
Figure 14:
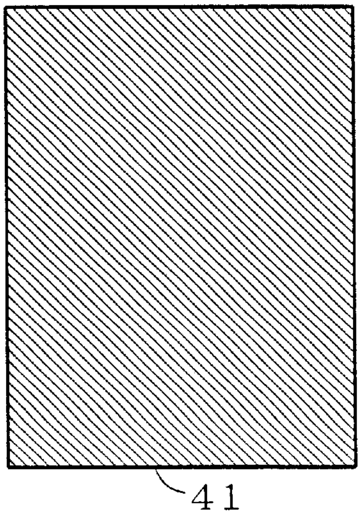
FIG. 14 is an illustration of a frame picture pattern.

The image signal processing part 18 receives an image signal of an original image such as an image 42 in FIG. 13, from an input terminal T1, and also a pattern signal for specifying a frame picture pattern such as a frame picture pattern 41 in FIG. 14 from a pattern input terminal T2. In a programmable ROM 13 previously stored is the size of the frame picture pattern which is preferably not less than the maximum shift length of the intermediate cutting position.

Figure 15:
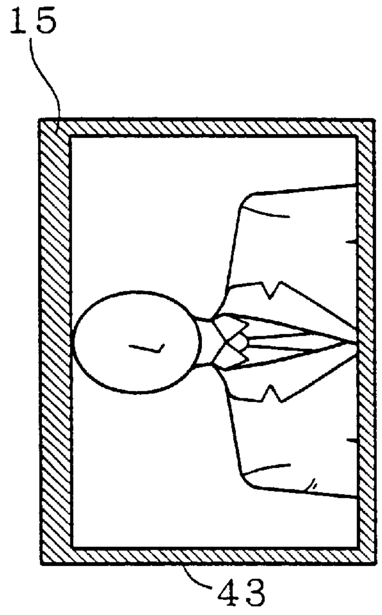
FIG. 15 is an illustration of an image overlaid on the frame picture pattern.

The image signal processing part 18 outputs a processed image signal of the image 43 as shown in FIG. 15 to the memory controller 22. The processed image signal is obtained by adding the frame picture pattern 15 having patterns specified by the pattern signal and the frame size obtained from the programmable ROM 13, to the original image. The other components or operations are all similar to those of the first preferred embodiment.

Since the processed image signal containing the frame picture pattern is provided by the image signal processing part 18 to the memory controller 22 according to the second preferred embodiment, the frame picture pattern 15 will be always printed at both top and bottom parts (longitudinal ends) of each printing image in multiple printing. Namely, the frame picture pattern 15 is always printed at an intermediate cutting position between images and its vicinity. Thus, even if the intermediate cutting position is somewhat shifted in the longitudinal direction, the printing paper is always cut at the frame picture pattern 15. Consequently, plural pieces of cut photographic pictures would not be deteriorated in appearance.

At this time, if the size of the frame picture pattern is set to be not less than the maximum shift length of the intermediate cutting position, even with the maximum shift length, the printing paper can be always cut at the frame picture pattern 15. Thus, plural pieces of cut printing paper would not be deteriorated in appearance.

Further, an additional value can be added to an original image by providing the pattern signal for specifying the pattern matching the image to be printed to the pattern input terminal T2. This improves plural pieces of cut printing paper in appearance.

Although the image signal processing part 18 inputs the pattern signal of the frame picture pattern, instead of the pattern signal, an image signal for specifying the frame picture pattern itself may be directly inputted and composed with the image signal obtained from the input terminal T1. In this case, the programmable ROM 13 does not need to store the size of the frame picture pattern.

Further, although the image signal processing part 18 of the second preferred embodiment inputs the image signal via the input terminal T1 and the pattern signal via the input terminal T2 as shown in FIG. 12, those signals may be inputted via only one input terminal by multiplexing or time-sharing the image signal and the pattern signal.

While the invention has been described in detail, the foregoing description is in all aspects illustrative and not restrictive. It is understood that numerous other modifications and variations can be devised without departing from the scope of the invention.

We claim:

1. An image printing apparatus comprising:

supply means for supplying printing paper of a predetermined width;

data conversion means for receiving an image signal from the outside and converting said image signal into data for printing;

printing means for printing at least one printing image longitudinally on said printing paper to obtain a print area, on the basis of said data for printing;

control means for giving a cutting command which indicates a cutting position of said printing paper and directs a cutting means to cut said printing paper at said cutting position; and said cutting means for laterally cutting said printing paper as directed by said cutting command of said control means, wherein a print width by said printing means, corresponding to a lateral direction of said printing paper, is set to be not less than said predetermined width of said printing paper, and wherein said control means determines a first cutting position that is shifted to the side of said print area with respect to a printing start position of said print area and a final cutting position that is shifted to the side of said print area with respect to a printing end position of said print area, and gives said cutting command which indicates said first and final cutting positions to said cutting means.

2. The image printing apparatus according to claim 1, wherein said print area includes a multiple print area where a plurality of printing images are longitudinally printed adjacent to each other; and said control means determines a border between adjacent printing images of said plurality of images as at least one intermediate cutting position, and gives said cutting command which indicates said at least one intermediate cutting position as well as said first and final cutting positions, to said cutting means.

3. The image printing apparatus according to claim 1, wherein said control means determines said first cutting position that is on the side of said print area not less than the maximum shift length to be caused by said cutting means with respect to said printing start position, and said final cutting position that is on the side of said print area not less than the maximum shift length to be caused by said cutting means with respect to said printing end position.

4. The image printing apparatus according to claim 3, wherein said print area includes a multiple print area where a plurality of printing images are longitudinally printed adjacent to each other; and said control means determines a border between adjacent printing images of said plurality of images as at least one intermediate cutting position, and gives said cutting command which indicates said at least one intermediate cutting position as well as said first and final cutting positions, to said cutting means.

5. The image printing apparatus according to claim 4, wherein said data conversion means includes:

image signal processing means for receiving said image signal, and obtaining a processed image signal by processing said image signal so that a picture pattern having a predetermined width is laterally printed at both longitudinal ends of each of said plurality of printing images on said printing paper; and processed image signal conversion means for converting said processed image signal into said data for printing.

6. The image printing apparatus according to claim 5, wherein said image signal processing means sets said predetermined width of said picture pattern to be not less than the maximum shift length to be caused by said cutting means.

7. The image printing apparatus according to claim 5, wherein said image signal processing means further receives a pattern signal for specifying a predetermined pattern, and obtains said processed image signal by processing said image signal so that said picture pattern including said predetermined pattern is printed.

* * * * *

UNITED STATES PATENT AND TRADEMARK OFFICE
CERTIFICATE OF CORRECTION

PATENT NO. : 6,281,981 B1
DATED : August 28, 2001
INVENTOR(S) : Shoji Yasui et al.

It is certified that error appears in the above-identified patent and that said Letters Patent is hereby corrected as shown below:

Column 1,
Line 31, change "proton roller 4" to -- platen roller 4 --.

Signed and Sealed this

Nineteenth Day of March, 2002

*Attest:*

JAMES E. ROGAN

*Attesting Officer*

*Director of the United States Patent and Trademark Office*